United States Patent [19]
Hwang

[11] Patent Number: 5,751,072
[45] Date of Patent: May 12, 1998

[54] VEHICLE SECURITY SYSTEM USING AN EXISTING SWITCH DEVICE, IGNITION KEY MANIPULATION, AND REMOTE CONTROL TRANSMITTER TO DISARM THE SYSTEM AND PROGRAM SECURITY CODES

[76] Inventor: Shih Ming Hwang, 17811 Sky Park Cir., Suite D & E, Irvine, Calif. 92714

[21] Appl. No.: 582,159

[22] Filed: Jan. 2, 1996

[51] Int. Cl.[6] ............................................. B60R 25/04
[52] U.S. Cl. ........................... 307/10.4; 180/287; 307/10.5
[58] Field of Search ................................. 307/10.1–10.6; 180/287; 340/425.5, 426, 825.3–825.32, 825.34, 825.69, 825.72; 123/198 DC, 198 DB; 70/278, DIG. 30, 237, 252, 256

[56] References Cited

U.S. PATENT DOCUMENTS

| | | |
|---|---|---|
| 4,209,709 | 6/1980 | Betton .................................. 307/10.2 |
| 4,447,850 | 5/1984 | Asher .................................. 307/10.2 |
| 4,533,016 | 8/1985 | Betton .................................. 180/287 |
| 5,079,538 | 1/1992 | DeFino et al. ....................... 340/426 |
| 5,307,048 | 4/1994 | Sonders ............................... 340/426 |
| 5,381,128 | 1/1995 | Kaplan ................................. 180/287 |
| 5,467,070 | 11/1995 | Drori et al. .......................... 340/426 |
| 5,479,156 | 12/1995 | Jones .................................. 340/825.31 |

*Primary Examiner*—Richard T. Elms
*Attorney, Agent, or Firm*—Bacon & Thomas

[57] ABSTRACT

A security system uses an ordinary switch, which may be an existing switch such as a parking light switch, to enter digits of a security code, with the beginning of a digit being indicated by turning on the ignition switch and the end of a digit being signified by turning off the ignition switch. Entry of the security code can be used to perform an emergency system disarm when the remote control transmitter is lost, to change the security code when the transmitter is in the possession of the owner, and to teach a new transmitter.

7 Claims, 8 Drawing Sheets

VEHICLE SECURITY SYSTEM USING AN EXISTING SWITCH DEVICE, IGNITION KEY MANIPULATION, AND REMOTE CONTROL TRANSMITTER TO DISARM THE SYSTEM AND PROGRAM SECURITY CODES

BACKGROUND OF THE INVENTION

1. Field of the Invention

The present invention relates in general to security systems, and more particularly to a security system which, by entering a programmable security code through the use of an ordinary economical push button switch or existing switch of a device inside a car, such as a parking light switch, hand brake switch, etc., can perform an emergency disarm function in case the remote control transmitter used to arm/disarm the security system is lost or malfunctions.

The present invention also relates more particularly to a security system which, by entering a programmable security code through the use of an ordinary economical push button switch or existing switch of a device inside the car, such as a parking light switch, hand brake switch, etc., teach new transmitter codes to the system.

Furthermore, the present invention also relates more particularly to a security system which uses the existing transmitter and an ordinary economical push button switch or existing switch of a device inside the car, such as the parking light switch, hand brake switch, etc., as a function switch to change the security code. Only the owner can know how to perform an emergency disarm, change the security code, and teach transmitter code functions to the security system.

2. Description of Related Art

Most security systems currently on the market have a switch which is sometimes called a valet switch. This switch disarms the security system in case the remote control transmitter used to arm/disarm the security system is lost or broken. For example, some vehicle security systems can be deactivated by simply pressing or flicking the hidden valet switch after turning ON or hot wiring the ignition key.

To prevent thieves from deactivating or disarming the vehicle security system, installers hide the valet switch. However, hiding the valet switch will not hinder the thieves from stealing the vehicle. Hiding the valet switch under the dash or in the glove compartment will not provide effective security for thieves who know they will always find the switch within reach of the driver's seat, or under the dashboard.

As a result, manufacturers and installers have started using keypads in order to prevent thieves from disarming the security system. However, keypads are expensive and difficult to install.

In addition, most vehicle security systems can learn to respond to new transmitters instantly by simply pressing the learning switch in a disarmed state, giving thieves the opportunity to program their transmitter into the targeted security system, or a fixed non-programmable security code that enables thieves familiar with the code to disarm the system.

SUMMARY OF THE INVENTION

It is an object of the present invention to provide a security system which offers optimum protection and yet is economical and easy to install.

It is another object of the present invention to increase protection by giving the user the privilege of changing the security code of the security system so that only the user can know how to perform an emergency disarm, change the security code, and teach a transmitter code function to the security system.

The security system of the present invention allows the user to perform an emergency disarm function or teach a new transmitter code should the remote control transmitter be lost or accidentally broken.

Unlike other security systems which can be disarmed easily by just flicking a switch after turning ON or hot wiring the ignition key, the security system of the invention can only be disarmed by entering the correct programmed security code.

According to the invention, the security code may consist of one or more digit(s) ranging from 1 to 5. Each digit can be any number from 1 to 255 for the first digit, or any number from 0 to 255 for any digit from 2 to 5.

To perform the emergency disarm function, the following steps are performed (using the example of a two digit security code in which the first digit is "4" and the second digit is "22", and the security system is in an armed mode):

1. Open door, then turn ON ignition key, at which time the siren will sound.
2. Press the function switch four times.
3. Turn OFF the ignition key.
4. Turn ON the ignition key.
5. Press the function switch twenty-two times.
6. Turn OFF the ignition key.
7. The security system is now disarmed.

Most vehicle security systems can be caused to learn new transmitter codes instantly by just pressing the learning switch in a disarmed state. This gives the chance for thieves to program their transmitter into the targeted security system. Unlike other vehicle security systems, however, the security system of the invention will not learn new transmitters unless the right security code has been entered.

To teach a new transmitter, the following steps are performed (again using the example of a two digit security code in which the first digit is "4" and the second digit is "22", but in which the security system is in a disarmed mode):

1. Turn ON the ignition key.
2. Press the function switch four times.
3. Turn OFF the ignition key.
4. Turn ON the ignition key.
5. Press the function switch twenty-two times.
6. Turn OFF the ignition key.
7. The security system is now in a learning mode.
8. Press any button of the new remote control transmitter.

Unlike other security systems which have the same code and cannot be programmed, the security system of the invention can be programmed/changed by the user. To change the security code, for example, from "4", "22" to "11", "10" with the security system in a disarmed mode, the following steps are performed:

1. Turn ON the ignition key.
2. Turn OFF the ignition key.
3. Within a period of, for example, five seconds (the period being variable), press the transmitter two times.
4. Turn ON the ignition key.
5. Press the function switch eleven times.
6. Turn OFF the ignition key.
7. Turn ON the ignition key.

8. Press the function switch ten times.

9. Turn OFF the ignition key.

10. The new security code is now "11, "10".

Unlike most conventional security systems using a keypad, in which each digit of the security code can only have possible combinations of 10, the present invention's first digit can have 255 combinations or be any number ranging from 1 to 255, while the second digit can have 256 combinations or be any number ranging from 0 to 255, since the invention uses an 8-bit data memory to contain each digit. As a result, the security code provided by the invention can have a total of 65,280 (255×256) possible combinations.

Optionally, a time limit might be provided in order to carry out the emergency disarm, security changing code, and transmitter learning steps, and the system might ignore any further code entries should the thieves commit mistakes in guessing the security code after a specific time has elapsed. An L.E.D. status indicator or other output devices such as parking lights might turn ON or OFF upon or after turning ON the ignition key or pressing the function switch. The security code can have 1, 2, 3, 4 or 5 digit(s), while the combinations of each digit may vary and need not be limited to 255 or 256 combinations, meaning that one could use a 16-bit or even 32-bit data memory to contain each digit. Also, the security system may use an existing switch of an electronic device, such as the parking lights switch, hand brake switch, car radio ON/OFF switch, door lock/unlock switch, dome light ON/OFF switch, door switch, and so forth, as an economical above-described switch to enter the security code.

It will be apparent to those skilled in the art that various modifications can be made to the security system of the instant invention without departing from the scope or spirit of the invention, and it is intended that the present invention cover modifications and variations of the vehicle security system, such as adding some programming features, e.g., programmable door lock/unlock time, active/passive arming, etc.

BRIEF DESCRIPTION OF THE DRAWINGS

The above and still further objects, features and advantages of the present invention will become apparent upon consideration of the following description of the preferred embodiment and accompanying drawings, wherein.

DETAILED DESCRIPTION OF THE PREFERRED EMBODIMENTS

Figure 1:
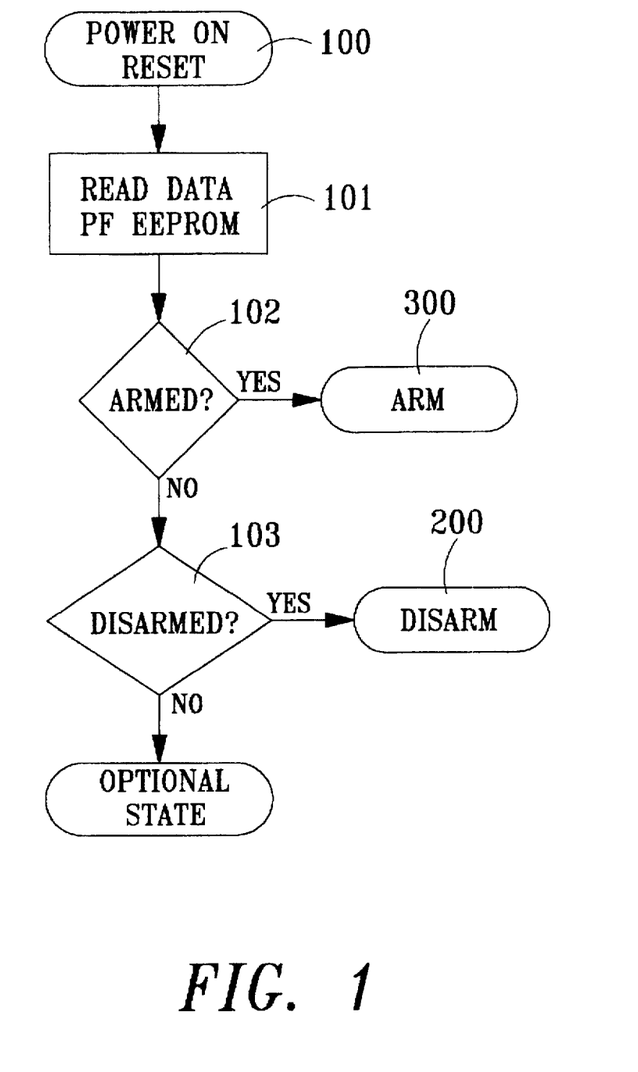
FIG. 1 is a flow diagram illustrating the initial condition of the security system during a power-on or reset operation.

Referring to FIG. 1, the security system initially reads data from an EEPROM, initializes variables, ports, and timers (step 101), including variables CODE1 and CODE2 for the security code, and determines if the security system is in an armed (step 102), disarmed (step 103), or other optional state such as a valet mode. If the security system is in an armed state, operation proceeds to the ARM subroutine (300). If the security system is in a disarmed state, operation proceeds to the DISARM subroutine (200) or operation proceeds to an optional state such as the valet mode.

Figure 2:
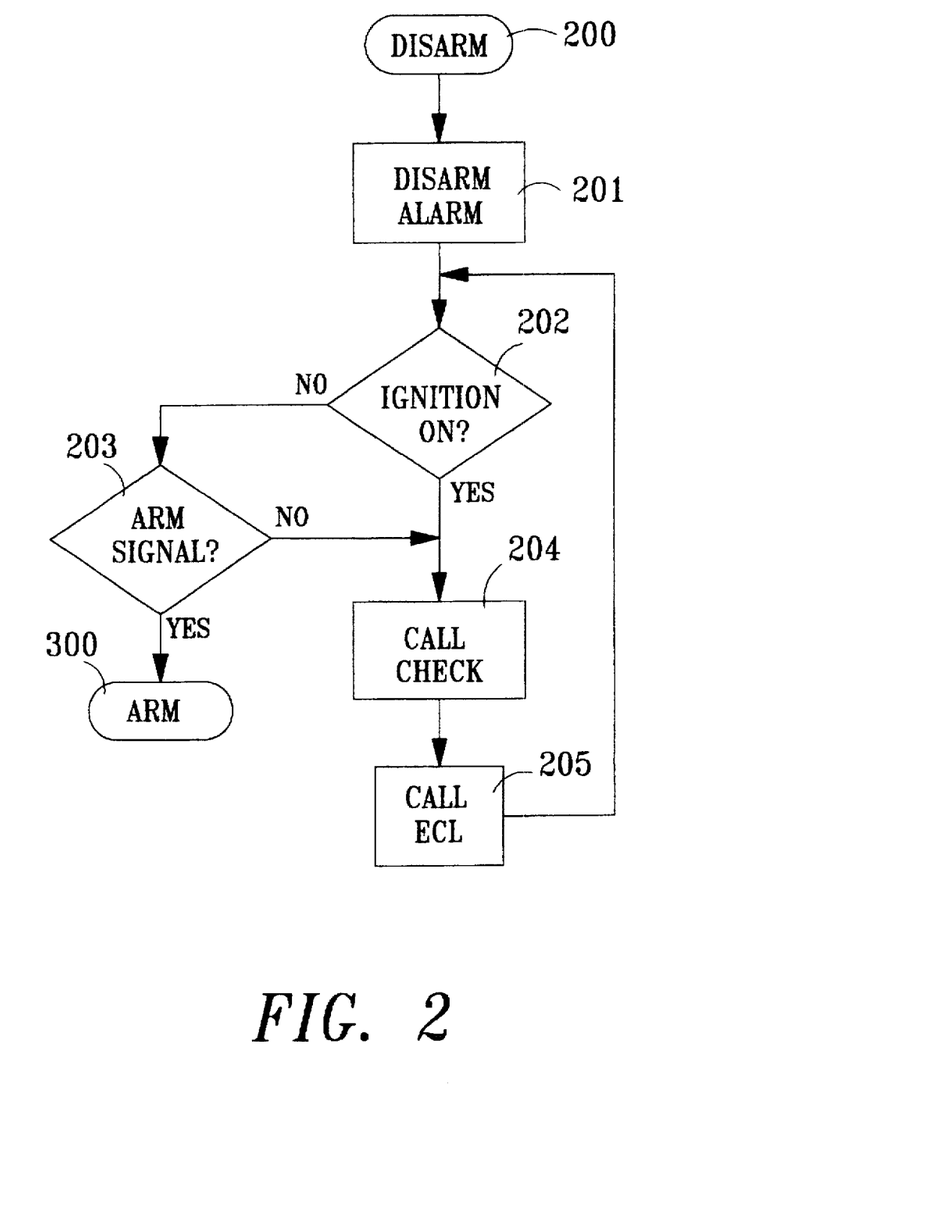
FIG. 2 is a flow diagram illustrating the operation of the security system during the disarm mode.

Referring to FIG. 2, the security system is disarmed at step 201, i.e., the siren stops if it is sounding, and the vehicle is mobilized, doors unlocked, etc. Then, the system checks if the ignition key is ON or OFF (step 202). If the ignition is OFF, the system checks if there is an arm signal (step 203). It is apparent to those skilled in the art that the arm signal may be active (manual, such as by remote control), or passive (automatic, i.e., last door arming or timer). If there is an arm signal, operation proceeds to the ARM Subroutine (300). Otherwise, it proceeds directly to step 204 where it calls the CHECK subroutine (400) to determine if there is a signal to set the security system in a security changing code mode or to activate a second function. Then, the system calls the ECL subroutine (500) at step 205 to determine if there is a signal to set the security system in a transmitter code learning mode or to perform a security code change if the security system is set in the security code change mode. Finally, the system returns to step 202.

Figure 3:
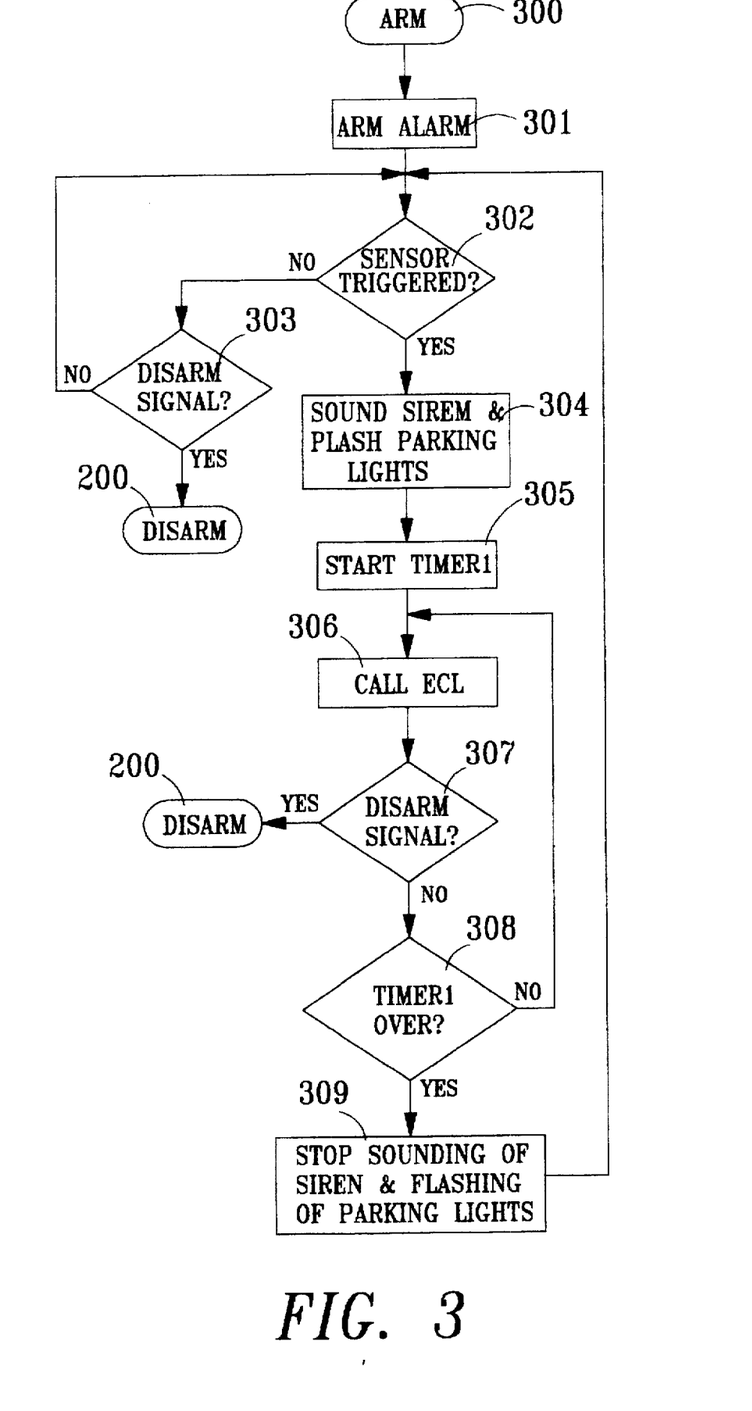
FIG. 3 is a flow diagram illustrating the operation of the security system during an arming mode.

Referring to FIG. 3, the ARM subroutine begins when the security system is armed (step 301) and the vehicle immobilized. At step 302, the system checks if there is a sensor triggered, e.g., a shock sensor, glass break detector, door sensor, etc. If there is a sensor triggered, the system checks if there is a disarm signal (step 303). If there is a disarm signal, the operation proceeds to the DISARM subroutine (200), or else operation goes back to step 302. If there is a sensor triggered, the siren sounds, parking lights flash (step 304) and TIMER1 starts (step 305). At step 306, the system calls the ECL subroutine (500) to determine if there is a signal to set the security system in an emergency disarm mode. At step 307, the system checks if there is a disarm signal which may be a signal from the remote control or the emergency disarm mode signal. If there is a disarm signal, operation proceeds to the Disarm subroutine, or else operation proceeds to step 308 where the system checks if TIMER1 is over or not. If TIMER1 is not yet over, the siren continues sounding while the parking lights continue flashing until there is a disarm signal or TIMER1 is over. If TIMER1 is over, the siren stops sounding, the parking lights stop flashing (step 309), and operation goes back to step 302.

Figure 4:
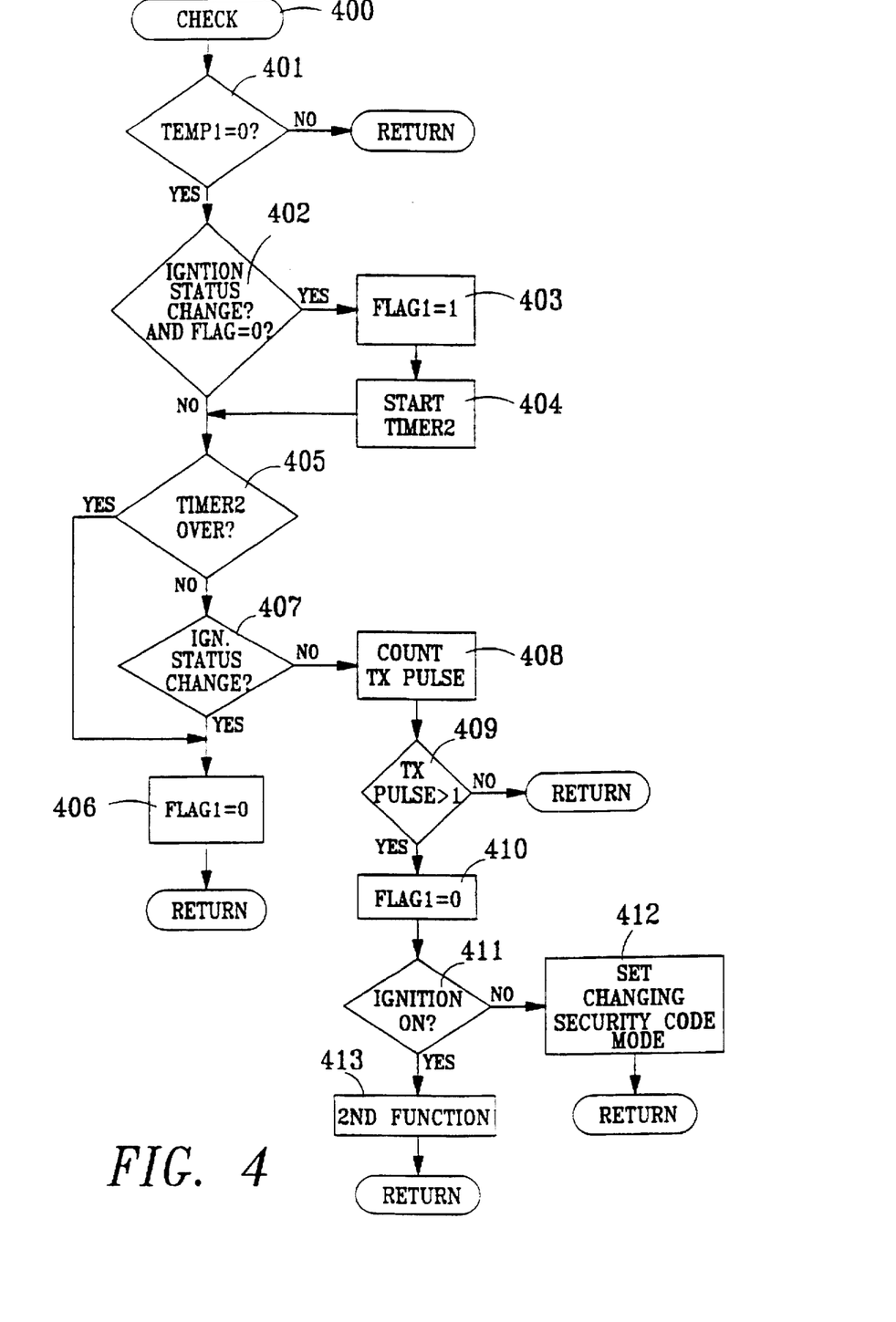
FIG. 4 is a flow diagram of the subroutine "CHECK" illustrating how to change the security code or activate a second function.

FIG. 4 illustrates the check subroutine (400). The main function of this subroutine is to determine if the transmitter has been pressed more than once within a period (TIMER2) after there is a change in the ignition state, either from OFF to ON or ON to OFF. If the transmitter has been pressed more than once, the security system is set in either the security code changing mode or a second function is activated depending on the state of the ignition key. At step 401, TEMP1 is checked and if clear, operation proceeds to step 402. Otherwise, the system exits the subroutine. At step 402, the system checks to see if there is a change in the ignition status either from OFF to ON or ON to OFF and also checks whether FLAG1 is clear. If so, FLAG1 is set and TIMER2 is started (steps 403 and 404). If not, operation proceeds to step 405 where the system checks TIMER2. If TIMER2 expires, operation proceeds to step 406 where FLAG1 is cleared and the system exits the subroutine. If TIMER2 is not yet over, operation proceeds to step 407 where the system again checks the ignition status. If there is a change in the ignition status, operation proceeds to step 406. Otherwise, operation proceeds to step 408 where the transmitter pulses are counted. At step 409, the transmitter pulses are checked and if the number of pulses is more than one, operation proceeds to step 410 where FLAG1 is cleared. Otherwise, the system exits the subroutine. At step 411, the ignition is checked. If the ignition is ON, the second function is activated (step 413). Otherwise, the security system is set to the security code change mode (step 412).

Figure 5:
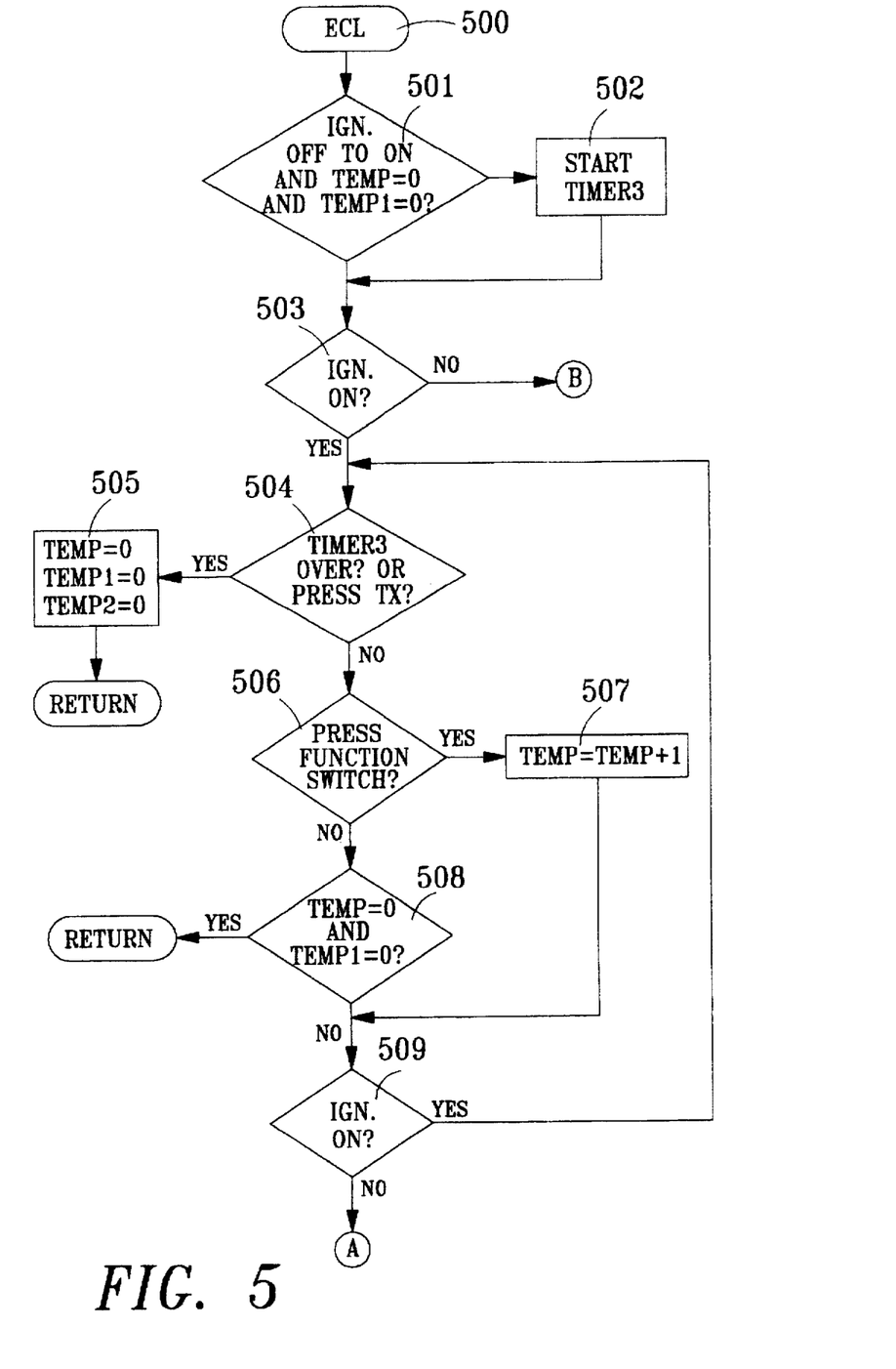
FIGS. 5, 5a, and 5b are flow diagrams of the most important subroutine "ECL" illustrating how to enter the security code, set the system to a transmitter code learning mode, or set the system to an emergency disarm mode.
Figure 5A:
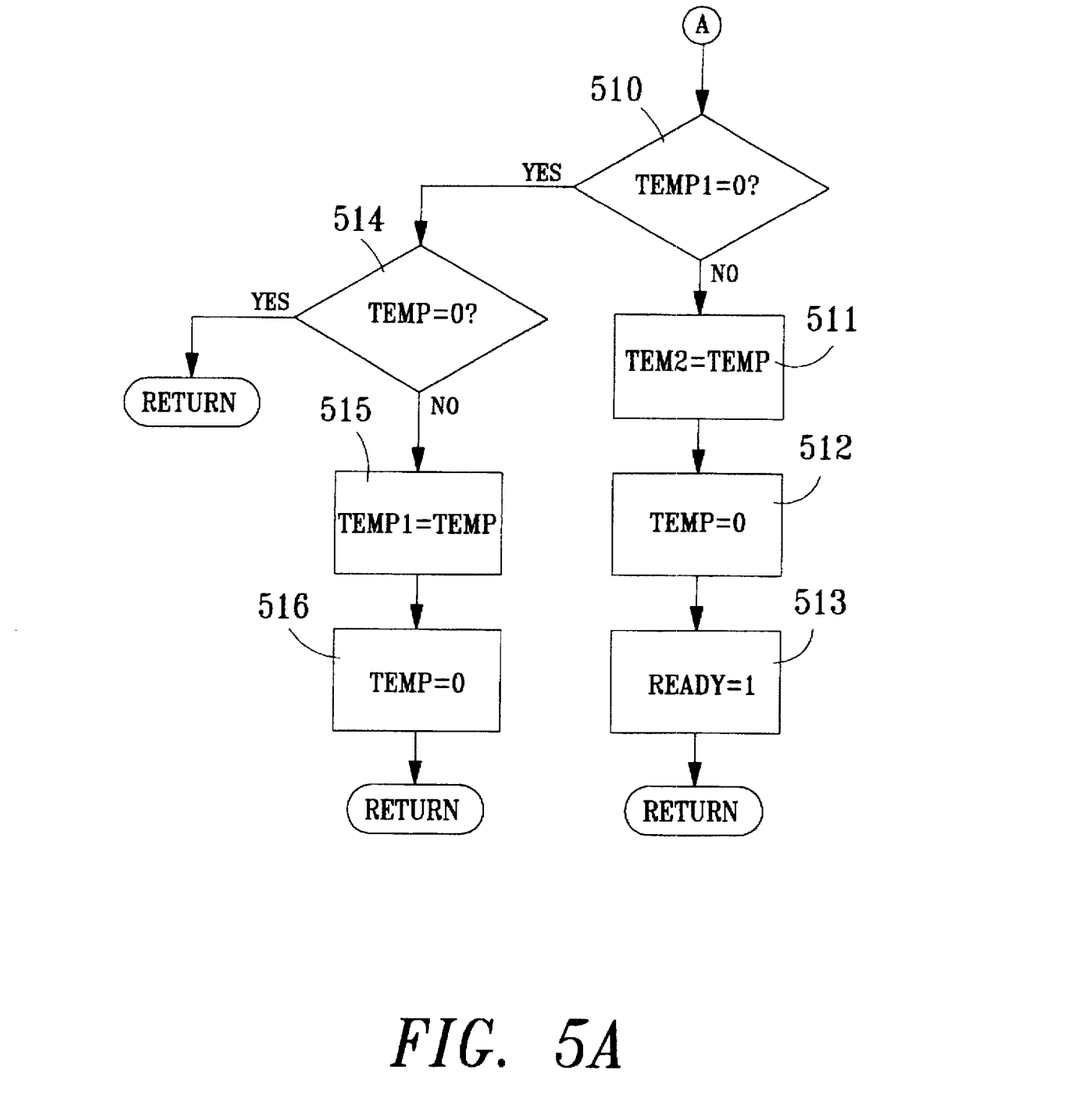
Figure 5B:
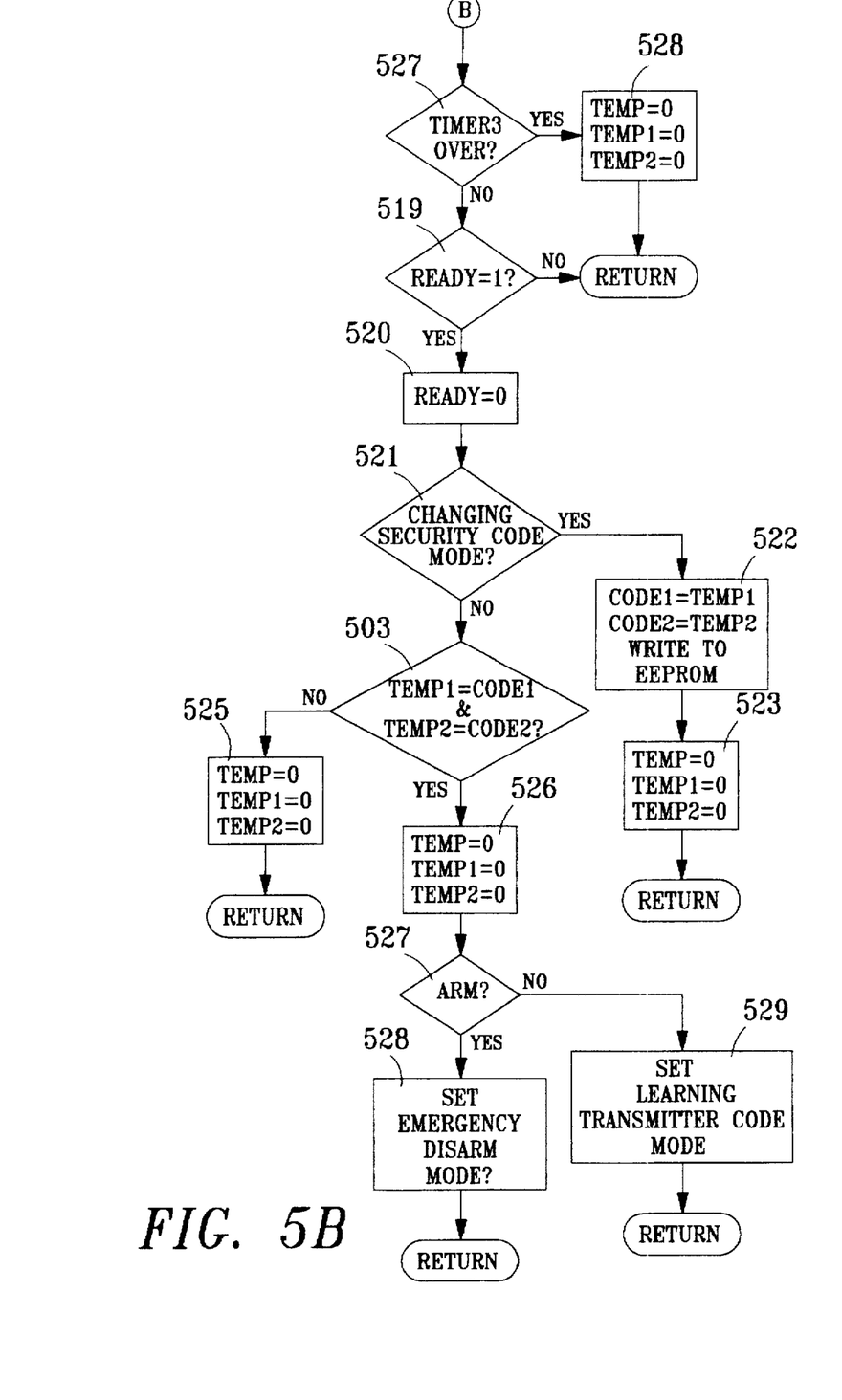

FIGS. 5, 5a, and 5b illustrate the ECL subroutine (500). The main functions of this subroutine are to enter a security code, save a new security code into the EEPROM if the system is in the security code change mode, and set the security system in the transmitter code learning mode or in the emergency disarm mode. At step 501, the ignition is checked to determine whether it has been turned from OFF to ON, and variables TEMP and TEMP1 are also checked to see if they are clear. If the above three conditions are met, TIMER3 starts (step 502). Otherwise, operation proceeds to step 503 where the ignition is again checked. If the ignition is OFF, operation proceeds to step 517 where the system checks whether TIMER3 has timed out. If TIMER3 has timed out, TEMP, TEMP1 and TEMP2 are cleared (step 518), and the system exits the subroutine. Otherwise, operation proceeds to step 519 where the system checks if variable READY is set or clear. If READY is clear, the system exits the subroutine. Otherwise, READY is cleared (step 520) and operation proceeds to step 521 where the system checks if it is set in CHANGING SECURITY CODE MODE. If it is set in CHANGING SECURITY CODE MODE, variables CODE1 and CODE2 are set to have the present values of TEMP1 and TEMP2, respectively (step 522), CODE1 and CODE2 are written or saved in EEPROM (step 522), and variables TEMP, TEMP1, and TEMP2 are cleared (step 523), after which the system exits the subroutine.

If the system is not set in CHANGING SECURITY CODE MODE (step 521), operation proceeds to step 524 where the system checks if TEMP1 equals CODE1 and TEMP2 equals CODE2. If not equal, TEMP, TEMP1, and TEMP2 are cleared (step 525) and the system exits the subroutine. If equal, TEMP, TEMP1, and TEMP2 will still be cleared (step 526) and the system checks if it is in the armed mode (step 527). If it is in the armed mode, the security system is set in EMERGENCY DISARM MODE (step 528) and exits the subroutine. However, if the security system is not in the armed mode, the security system is set in LEARNING TRANSMITTER CODE MODE (step 529), and then exits the subroutine.

If the ignition is ON (step 503), operation proceeds to step 504 where the system checks if TIMER3 is over or if there is a transmitter signal. If either TIMER3 is over or if there is a transmitter signal, the system clears TEMP, TEMP1, and TEMP2 (step 505) and exits the subroutine. Otherwise, operation proceeds to step 506 where the system checks if the function switch is pressed. If it is pressed, TEMP is incremented (step 507) and operation proceeds to step 509. Otherwise, operation proceeds to step 508 where the system checks if both TEMP and TEMP1 are clear. If both are clear, the system exits the subroutine else operation proceeds to step 509 where the system checks whether the ignition key is ON or OFF. If the ignition is still ON, operation goes back to step 504. Otherwise, the system checks if TEMP1 is clear (step 510), and if TEMP1 is clear, the system checks if TEMP is also clear (step 514). If TEMP is clear, the system exits the subroutine. Otherwise, TEMP1 is set to have the present value of TEMP (step 515), and then, TEMP is cleared (516). Then, the system exits the subroutine. If TEMP1 is not clear (step 510) TEMP2 is set to have the present value of TEMP (step 511), and then TEMP is cleared (step 512) while READY is set to one (step 513), after which the system exits the subroutine.

Figure 6:
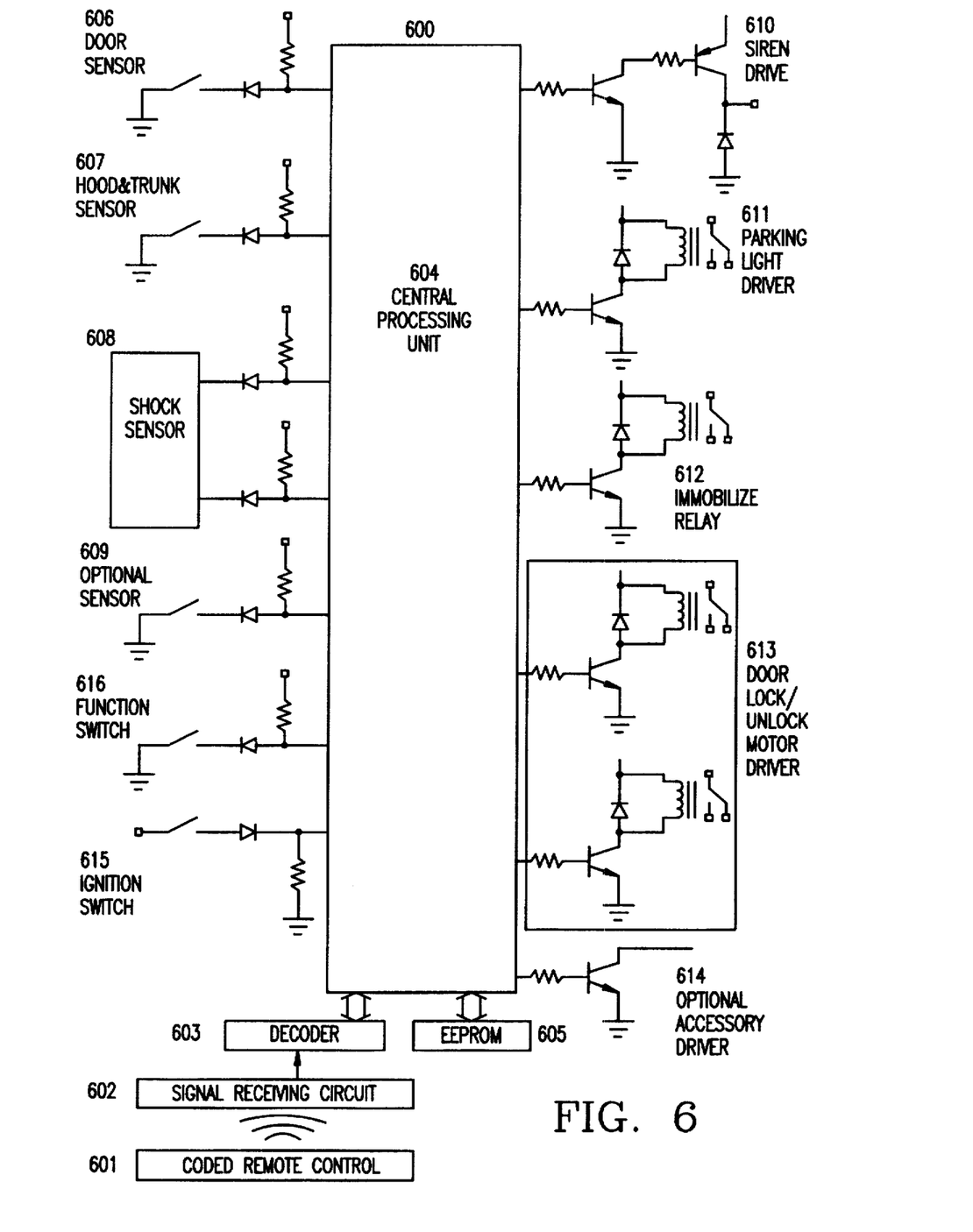
FIG. 6 is a block diagram of a security system constructed according to the principles of the preferred embodiment of the invention.

FIG. 6 is a block diagram of the preferred security system 600, which includes a remote control transmitter 601 capable of transmitting a coded signal, signal receiving circuitry 602, decoder 603, central processing unit 604, EEPROM 605, door sensor 606, hood and trunk sensor 607, shock sensor 608, optional sensor 609, siren driver 610, parking lights driver 611, immobilizer relays 612, door lock/unlock motor driver 613, optional accessory driver 614, ignition switch 615, and function switch 616.

The coded remote control transmitter 601 is conventional and is used to arm and disarm the security system, and is also used to put the security system in the security code changing mode, valet mode, panic mode, programming mode, and so forth, and as is known is also used to lock and unlock doors and turn on or off various accessories.

The receiving signal circuitry 602 is conventional and is used to receive and amplify the coded signal transmitted by the remote control transmitter. The signal is decoded by the decoder which has a built-in EEPROM 603 for storing codes. After decoding, the signal is sent to a central processing unit 604 for processing.

As is also conventional, the central processing unit 604 arms the system if the signal received is an arming signal, disarms the system if the signal received is a disarming signal, enters into a programming mode if the signal received is a programming signal, enters into panic mode if the signal received is a panic mode signal, enters into security change mode if the signal received is a security code change signal, unlocks or locks the doors upon receiving a corresponding locking or unlocking signal, and so forth.

Also as is conventional, the door sensor 606, hood and trunk sensor 607, shock sensor 608, and an optional sensor 609 which can be in the form of a glass break detector, an ultrasonic sensor, a microwave sensor, or other known types of detectors, are used to sense intrusions to the vehicle. The siren driver 610 and parking lights driver 611 are used as a confirmation signal during arming, disarming, programming, and so forth, and are also used to attract attention so as to scare thieves during intrusion into the vehicle.

As illustrated in FIG. 6, the EEPROM 605 is a storage chip used to store data for use by the CPU, including data concerning the operating modes of the security system, security codes, and so forth. The immobilizer relays 612 are part of the conventional security system and prevent the car from being stolen when the security system is armed. Finally, the door lock/unlock motor driver 613 is used to lock and unlock doors using the remote control, while the optional accessory driver 614 can be used to remotely open the trunk or other operate other accessories on the vehicle in known manner.

The ignition switch (615) is used to detect attempts to start the vehicle during arm mode. The ignition switch (615) is also used together with the function switch (616) to enter security code so as to perform emergency disarm functions during arm mode, to learn or add new remote control transmitter into the system.

What is claimed is:

1. A method of entering security codes into a vehicle security system for a vehicle having an ignition switch and at least one other switch, comprising the steps of:

turning on the ignition switch;

actuating the other switch a number of times corresponding to a first digit;

turning off the ignition switch to signify an end of the first digit;

actuating the other switch a number of time corresponding to each additional digit to be entered; and turning on the ignition switch to signify the beginning of each of the additional digits and turning off the ignition switch to signify the end of each of the additional digits.

2. A method as claimed in claim 1, further comprising the step of disarming the security system upon entry of said digits when a remote control transmitter for the security system is lost.

3. A method as claimed in claim 1, further comprising the step of enabling the security system to learn, program, or add a new transmitter upon entry of said digits.

4. A method as claimed in claim 1, further comprising the step of enabling a new security code to be entered upon actuation by a remote control transmitter for the security system.

5. A method as claimed in claim 1, wherein the step of actuating the other switch comprises the step of actuating a switch selected from the group consisting of a parking light switch, turn signal switch, brake switch, door switch, and a door lock/unlock switch.

6. A method as claimed in claim 1, further comprising the step of storing the digits to be entered by actuating the other switch in a memory, the highest digit that can be entered being determined by a size of said memory.

7. A method as claimed in claim 1, further comprising the step of permitting entry of said digits only within a predetermined time period.

* * * * *